Patented July 3, 1951

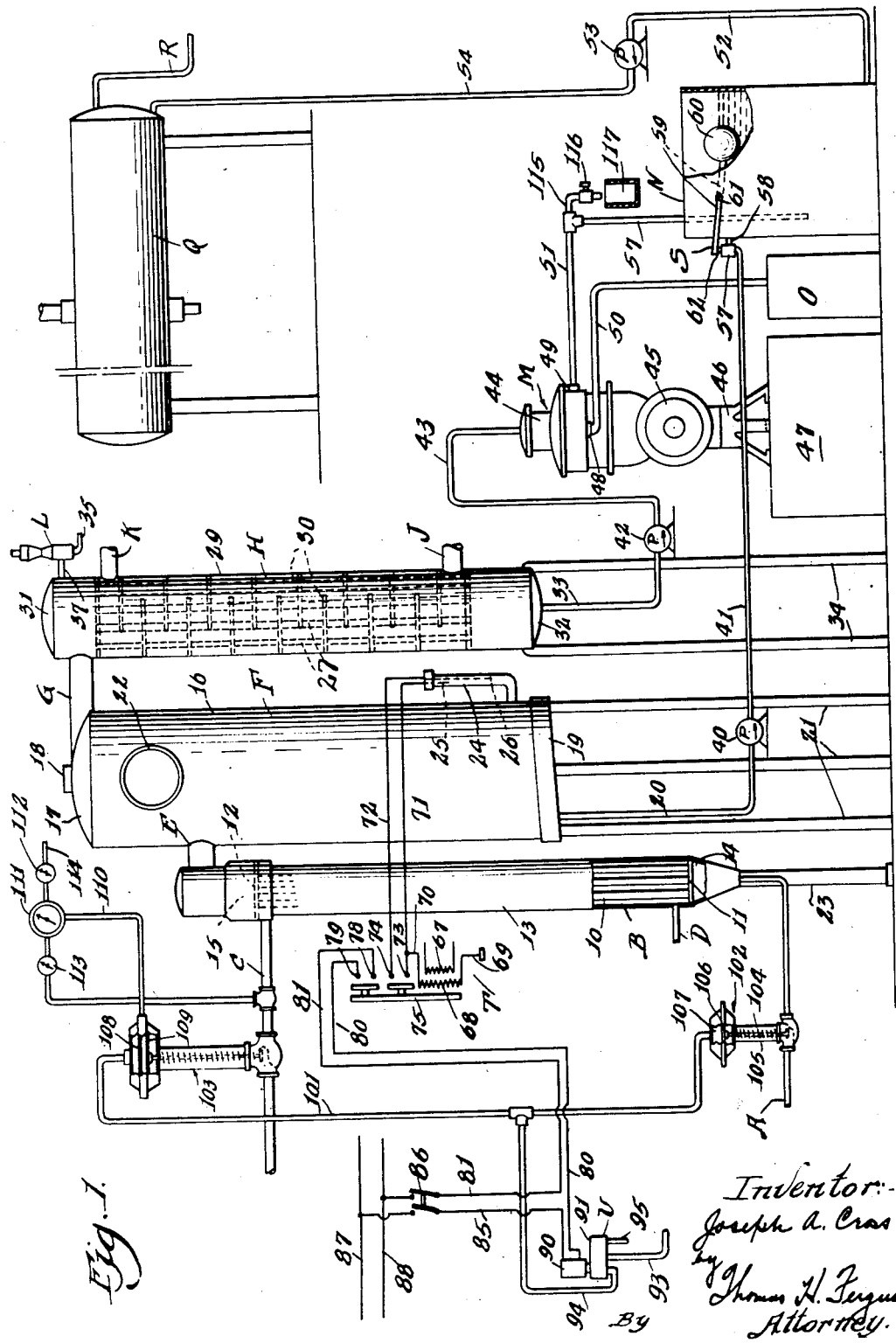

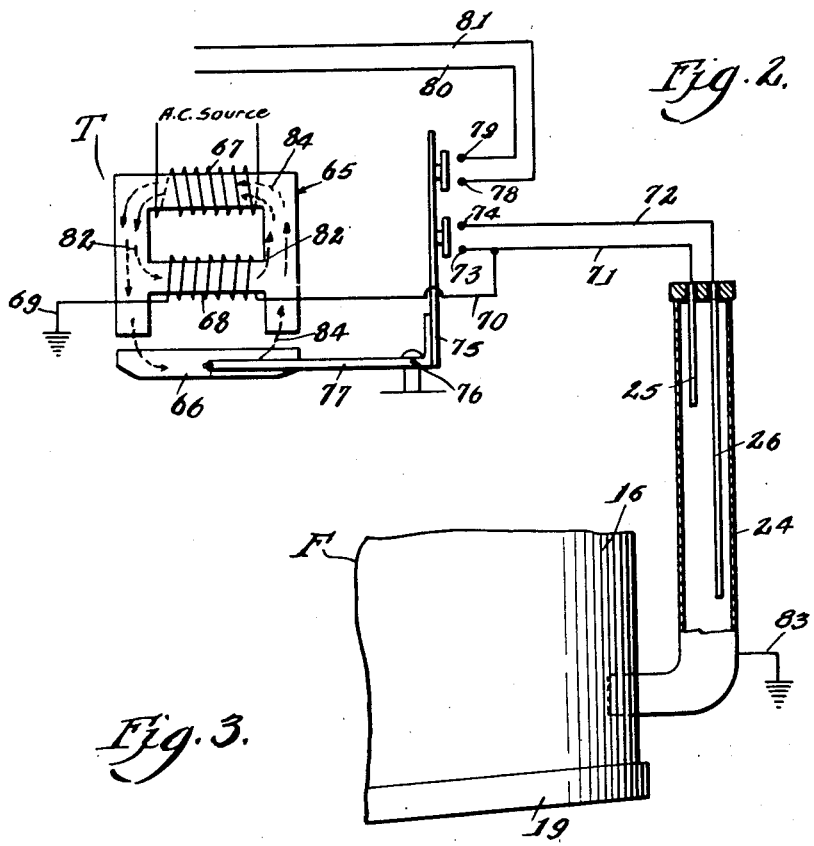

2,558,933

UNITED STATES PATENT OFFICE 2,558,933

DISTILLATION APPARATUS FOR REMOVING OIL FROM CITRUS FRUIT JUICES

Joseph A. Cross, Westerville, Ohio, assignor to Mojonnier Bros. Co., a corporation of Illinois Original application October 31, 1945, Serial No. 625,741. Divided and this application May 21, 1947, Serial No. 749,544

4 Claims. (Cl. 202—197)

1

The present invention relates to apparatus for use in removing oil from citrus fruit juices.

It is a well known fact that if a citrus fruit juice be concentrated without removing any of the oils, it will have a flavor and odor which is highly objectionable as compared with the freshly prepared juice. In concentrating, it is therefore quite desirable to remove more or less of the oil from the juice during the process of concentration and to keep it out of the marketed product.

It will be found that upon heating a citrus fruit juice to a high temperature, such as employed in canning, the objectionable oils will collect at the top of the main body of the juice. If this upper layer then be drawn off and sealed in sterile containers, it will develop a strong, rancid odor and flavor, not possessed by the residue of the liquid, so that if the juice, thus freed of these oils, be sealed in sterile containers, it will not develop the objectionable odor and flavor, even though it has been heated.

One object of the invention is to provide a novel apparatus by which more or less of the oils of the original citrus fruit juice may be abstracted and drawn off from the main body of the juice, leaving the latter free of the objectionable flavor and odors, and ready to be filled into cans and marketed as a palatable product.

Another object is to provide for a separation of the heavier and lighter substances, the substance containing the oils always being the lighter of the two, and then returning the heavier substance back into the main stream while retaining the oil substance separate from the merchantable product. Thus, all the pleasing portion is retained and the objectionable oils removed.

Another object is to improve the grading of the product. By increasing the recovery of the juice without the oil, the grade may be raised. Otherwise, an inferior grade may be assigned, due to too much oil being included. Thus, the invention becomes of prime importance in packing plants where the juice is canned and packed for market.

Another object is to render the system as nearly automatic as may be, thus allowing for the stopping and starting of the canning machine without requiring corresponding hand operations in the rest of the equipment.

Still another object is to work with the juice at as low a temperature as possible. If the juice is unduly heated, it loses its flavor.

These and various other objects, features and advantages will be apparent as we proceed with the following detailed description, the same being read in connection with the accompanying drawings in which the various pieces of apparatus are grouped and connected to carry out the new process.

It may be noted at this point that this application is a division of my prior application Ser. No. 625,741, filed October 31, 1945, now Patent No. 2,534,341.

In said drawings,

Fig. 1 is a general diagrammatic view of apparatus constructed and arranged in accordance with the present invention;

Fig. 2 is a diagrammatic view of the level control mechanism employed in the controls;

Fig. 3 is a detail view, partly in vertical section, of a solenoid valve also employed in the controls; and Fig. 4 is a detail view, also in partial vertical section, illustrating the eductor employed in the system.

Throughout these views, like characters refer to like parts.

As a preliminary, it may be briefly pointed out that the raw juice enters the system through a valve controlled inlet A. It then passes upward through the tube nest heater B where it is heated and evaporated by a valve controlled steam supply entering through the steam inlet C and departing as condensate through the steam outlet D. The temperature of the juice upon entry into the tube nest is approximately 70° F. and upon emergence therefrom approximately 130° F. At least, that is the case in an actual installation which is here chosen for illustration. From the top of the tube nest B, the juice and vapor pass through a relatively large channel E into the upper portion of a separating chamber F. As it enters this chamber, it expands, the liquid drops to the bottom, and the vapor, including the lighter oils, goes to the top of the chamber. Then the said vapor passes through the relatively large channel G into the upper part of the surface condenser H. This condenser receives its cooling water through a water inlet J and discharges it through a water outlet K. In this condenser the latent heat is removed and the oil and vapor, emitted through the passage G, becomes a liquid which drops to the bottom of the condenser. An eductor L removes the non-condensible gases and maintains a vacuum of approximately 25 inches of mercury, the vacuum communicating with the chamber F and the tube nest heater and evaporator B. Indeed, the vacuum extends through the tubes of the tube nest and down into the juice supply pipe A even to the control valve by which the supply is controlled. A centrifugal separator M receives the condensate from the condenser H and separates it into a lighter portion which contains the objectionable oils and a heavier portion which contains the residue which it is desired to save. The latter and the condensate from the separating chamber F are collected in a convenient receptacle or juice tank N. The oil is collected in a barrel or other receptacle O. In the receptacle N, the reclaimed condensate is blended with the partly concentrated juice pumped from the separating chamber F, restoring the juice to substantially its original condition. The reconstituted juice is then pumped to the heat exchanger Q. From the latter it goes to the filling machine where it is filled into cans, passing through the pipe R. The controls which include a float controlled valve S, an electric relay T and a solenoid valve U, come into play whenever the canning is stopped for a long enough interval, as will appear hereinafter. During normal operation, the juice flows continuously as a stream through the system.

Before considering the apparatus in detail, it may be pointed out also that the percentages of oil permitted in grade A juice by government specifications is .014 for the upper limit of grape fruit and .03 for the upper limit of orange juice. The ordinary Florida grape fruit juice and orange juice, when subjected to my process, has an entering percentage of from .017 to .04 of oil, and after passing through the process it leaves with a reduced percentage of from .0059 to .0133. Raw lime juice may be somewhat higher in percentage of oils.

Now, referring to the apparatus, the tube nest heater and evaporator B is of the kestner type and includes a nest of upright tubes 10 which pierce, at their opposite ends, diaphragms 11, 12, which are located toward the ends of the shell 13, leaving an entrance compartment 14 and an outlet compartment 15 for the juice and vapor. The steam is admitted to this nest of tubes through the inlet pipe C which communicates with the shell 13 at a point just below the upper diaphragm 12. Steam escapes as condensate through the pipe D located just above the lower diaphragm 11. The steam thus admitted fills the space around the tubes and heats them and their contents. The juice coming in at A ordinarily fills up about one-third the height of the nest and by that time it is boiling violently and producing vapor. Thus the upper two-thirds, or thereabouts, of the nest is where the evaporation takes place and there the vapor reaches its high temperature of approximately 130° F.

Thus, to repeat, the lowermost one-third of the heater and evaporator B is occupied by the juice and oil in liquid form. From that point, or approximately that point, upward, the evaporation takes place progressively. Both the liquid and oil are vaporized and emerges as, say 90% liquid, and 10% a mixture of watery vapor and oily vapor.

It is noted that in the heater and evaporator B, the steam is supplied through the inlet C in accordance with the amount of oil in the original juice; the greater the oil, the higher the steam pressure. This does not raise the temperature, and is not supplied for that purpose, but to increase the amount of vaporization. The temperature, in the assumed case, is 70° F. upon entering the tubes, rises to 130° F. at a point approximately one-third the way up the tubes and remains at approximately that temperature at the top where it emerges, and gets no higher on its way through the system.

Thus, heating the juice to only a maximum of 130° F. produces the beneficial effect of not damaging the flavor of the juice, which occurs when the juice is heated to a high temperature, such as 240° F., proposed in certain systems. Consequently, there is no flashing of the juice from a high temperature to a low one, with the resulting damage to the flavor.

As a result, the upward flow of the juice through the tubes 10 from compartment 14 to compartment 15, which is connected, as before explained, by a large channel E to the separating chamber F at a point well toward the top of that chamber, is effected.

Thus, the separating chamber F receives the vaporized juice at a temperature of some 130° F. with its corresponding pressure (2.221 lbs. per sq. in. absolute) into a large volume vacuumized tank, thereby causing the heavier substances to fall to the bottom of the chamber and the lighter substances to rise. This evaporation of the heated juice in a vacuum produces the first separation of the juice and the oil. Thus, the oil vapor constituent of the juice is separated from the heavier liquid constituent.

The chamber F includes a shell 16 having a top 17 provided with a peephole 18. At its lower end it has a bottom 19 which has a slight inclination toward the outlet pipe 20 through which the liquid is adapted to pass while the vapor in the upper portion passes out through the large passageway G to the upper end of the condenser H. Suitable legs 21 support the separation chamber F. The latter is also provided with a manhole 22 located near its top, so that it may be entered to be cleaned. The lower end of the chamber B is supported upon a leg 23 and reaches well below the bottom of the separating chamber F, as illustrated.

As before pointed out, the condenser H, the chamber F, and the heater B are vacuumized by the eductor L. The chamber F is also provided with a tube 24 which extends from the bottom of the chamber and is bent upward as shown. This tube contains the electrodes 25, 26, which cooperate with the relay T in the control of the juice level within the separating chamber F, as we shall presently show in detail.

The condenser H comprises a shell 29 provided with a number of retarding baffles 30, each of which extends part way across the shell in a manner to cause the cooling liquid to flow in an elongated path through the chamber. The cooling medium ordinarily is water which is admitted to the lower portion of the chamber through the pipe J and is carried away from the upper portion of the chamber by the pipe K. This condensing chamber is of the surface type. It includes a nest of tubes 27 which interconnect compartments at the top and bottom of the chamber 29 after the manner of the heater B. It is provided with a top 31 and a bottom 32. The vapors are cooled by the water flowing upward through its elongated path around the tube nest 27. The tubes pierce the baffles 30. An outlet pipe 33 leads away from the bottom 32 of the condenser. The condenser is supported by suitable legs 34.

The condenser H is a conventional surface type and the cooling medium may be passed through the tubes with the vapors flowing around the tubes instead of the reverse manner described above.

The condenser H is also provided with the eductor L, which operates on the ejector principle and is shown in detail in Fig. 4. It includes a steam pipe 35 which passes steam through a Venturi passage in the casing 36, and thus withdraws air and other noncondensibles from the condenser H, separating chamber F and heater B by way of pipe 37, the steam discharging through an outlet pipe 38. Thus a vacuum is produced within the chambers H, F and A, and the non-condensibles are drawn off and discharged through discharge pipe 38. The eductor L provides a vacuum of approximately 25 inches of mercury.

That portion of the juice which comes directly from the separating chamber F through pipe 20, is pumped by pump 40, preferably a centrifugal pump, through pipe 41 into the receptacle N. At the same time, that portion which is collected in the condenser H and is conveyed by pipe 33 is pumped by pump 42 through pipe 43 to the intake 44 of the centrifugal separator M.

The centrifugal separator is driven by a suitable motor 45, electric or otherwise, and is mounted upon a base 46 which rests upon a pedestal 47. This separator may be of well known construction and need not be further described, other than to say that it has an inner outlet 48 and an outer outlet 49. The function of this separator is to take the condensate that comes from the condenser H and separate it into its heavier portion and its lighter portion. The lighter portion passes from the inner separator-outlet 48 through a pipe or conduit 50 to an oil receptacle O, which may be a barrel or other device capable of being shifted about. The heavier portion is passed from an outer separator-outlet 49, through a pipe or conduit 51 into the juice tank or other saving receptacle N, and mixes at once with the juice which comes from the separating chamber. In other words, part of the juice is taken from the separating chamber and at once collected, while the part that is taken from the condenser is separated mechanically into a heavier portion and a lighter portion. The heavier portion is substantially free of the objectionable oils and is returned to the juice taken from the separating chamber. The lighter portion contains the objectionable oils and is deposited in a separate container to be separately used or otherwise disposed of. Both deliveries occur at convenient collecting points.

From the juice tank or receptacle N, a pipe 52 leads to the intake of a centrifugal pump 53 which forces the juice through pipe 54 into a heat exchanger Q of the Mojonnier type, which is of well known construction. The juice, passing through it, is heated by steam and the same is regulated to bring the juice to a proper temperature for canning. It is thus forced through pipe R onto the canning machine.

Now, when it becomes necessary to stop the canning machine for a long interval, the supply of juice through pipe A must be cut off and also the supply of steam through steam pipe C. If the interval be short, the operation may be different, as will be noted when we consider the equipment involving the controlling elements S, T and U.

The first control device to be considered is the mechanism S. This may be a float controlled valve of well known construction. The pipe 41, as shown, enters the lower portion of the valve proper, designated 57, and the latter is connected by a short pipe 58 with the tank N. The lever 59 carries a float 60 at its free end and moves about a pivotal point 61 and at its opposite end presses down upon an upstanding pin 62 to close the valve whenever the ball 60 rises and, upon the reverse movement of the ball, to open the valve. Thus the supply of juice through the pipe 41 is controlled. When the tank contents reach the critical level, the juice is throttled, and whenever they fall below a certain level, the valve opens. There are many valves that may be used. Suffice it to call attention to the following United States patents which show valves of this kind: No. 604,013, Carmichael, Nov. 17, 1898; No. 1,886,468, Cornich, November 8, 1932; and Reissue No. 18,253, Heath, November 17, 1931.

The next piece of control equipment we may consider is the electrical equipment for controlling the level of the liquid within the separating chamber F. It includes the electrodes 25 and 26 (within the tube 24) and the relay T. One of these electrodes (25) is a short electrode and the other (26) is a long one. Starting from the bottom, as the juice rises and reaches the long electrode 26, nothing happens. As it continues to rise, nothing happens until it encounters the short electrode 25. Then the relay T is pulled up by the current and remains up until the juice, upon again receding, leaves the long electrode 26. Then the cycle is repeated.

To bring about this operation, I preferably employ the relay mechanism T shown in Figs. 1 and 2, although other devices for accomplishing the same result may be substituted, as desired. In the electric relay mechanism T, there is a magnetic core 65 and a cooperating armature 66. The upper branch of the core is provided with an exciting coil 67 connected to a suitable alternating current source as indicated. The middle branch is provided with a surrounding coil 68 which has one end connected to ground by conductor 69, and the other end connected by conductor 70 to conductor 71 which leads to the short electrode 25 of the separating chamber F. A conductor 72 leads from the long electrode 26. Both conductors 71, 72 lead to normally open back contacts 73, 74, respectively, of an armature actutaed upright arm 75 mounted on a fixed pivot 76 and fixedly secured to a substantially horizontal arm 77 secured by a pin and slot connection with the vertically moving armature 66. Normally open back contacts 78, 79 are connected by conductors 80, 81, respectively, which extend toward the relay mechanism U.

In operation, the alternating current passing back and forth through the exciting coil 67 sets up a magnetic flux in the core 65 which takes the path of least resistance, as indicated by the arrows 82. So long as the circuit through the contact coil 68 remains open, as it does until the level of the juice in the separating chamber reaches the short electrode 25, nothing happens. But as soon as that contact is encountered by the liquid in the chamber reaching the short electrode 25, both ends of the circuit through the coil 68 are grounded, the one end being grounded through conductor 69 and the other end through the chamber F, indicated by ground connection 83. As soon as this circuit is completed, the coil 68, being now energized, sets up a counter-magnetic flux in opposition to that through the center branch of the core, and a new flux path results. This includes the upper branch and the armature 66, which is now forcibly drawn to the core poles. This new flux path is indicated by the arrows 84.

Thus, when the juice level reaches the short contact 25, a circuit for the induced current through coil 68 is completed from ground 83, through the juice to contact 25, thence by way of conductors 71, 70, coil 68 to ground at 69. Once this circuit is completed and the relay operated, the circuit through conductors 80, 81 is closed at contacts 78, 79 and a locking circuit for the coil 68 is maintained from conductor 70 of the coil 68 through back contacts 73, 74, conductor 72, electrode 26 and intervening juice to ground at 83, and such locking circuit is continued until the juice level falls below the electrode 26, thereupon interrupting the locking circuit at the electrode 26. The coil 68 is no longer supplied with a path for current, and the relay drops its armature 66 back to normal. This cycle is repeated, when the juice again reaches the short electrode 25. Thus, the electric relay T operates the electro-pneumatic means U in response to a high and low level of the juice in the separating chamber F.

The conductor 80 extends directly to one terminal of the solenoid of the electro-pneumatic device U. The other terminal is provided with a conductor 85. The two conductors 85 and 81 are connected to a supply switch 86 through which current is adapted to be supplied to the solenoid from supply leads 87, 88.

The solenoid of the device U comprises a coil 90 mounted on a frame 91 which is hollowed out to provide an air chamber 92 provided with an air inlet 93, an air outlet 94 and an exhaust outlet 95. These openings are controlled by a lever 96 pivoted at an intermediate point 97 and pressed upward at one end by a compression spring 98 to form a tight seal upon the supply inlet 93, as shown. The end of the lever 96 opposite the spring pressed end, is actuated by the solenoid core 99 which forms a loose connection therewith. When the core 99 is down, the lever 96 is in the position illustrated. Then the outlet 94 is connected through the chamber 92 to atmosphere, the outlet 95 being open. At such time the air supply inlet is closed by the lever 96 being firmly seated upon the inlet nipple. When the core 99 is in elevated position, the connection to atmosphere is closed at 95 and open at 93, thereby supplying the piping connections 94 with compressed air received through pipe 93 from a suitable source (not shown). The open end of the chamber 92 is closed by a screw plug 100.

The pipe 94 is directly connected with a pipe or conduit 101 which communicates with the pressure actuating chambers of the control valves 102, 103. Each of these valves is a diaphragm valve which is pneumatically operated by compressed air supplied through the pipe 101. The valve 102 controls the juice supply line A. The valve 103 controls the steam supply line C. Each of these valves is normally open. That is the condition when the equipment is operating and the separating tank is not too full. These valves are well known.

The juice supply valve 102 comprises an outer casing 104, a vertically movable stem 105, normally spring pressed upward against the diaphragm 106 to hold the valve open as indicated. On the upper side of the diaphragm 106 is a connection with the compressed air chamber 107 located within the head of the casing 104. A suitable supply of compressed air through pipe 101 will force the valve shut.

The steam supply control valve 103 is similar in construction and operation, but it is provided with two diaphragms 108 and 109 and compressed air supplied through pipe 101 or through pipe 110 will actuate the valve to close it. When compressed air is admitted through the pipe 101, it forces both diaphragms 108 and 109 downward and acts upon the head of the stem to force the valve shut. Similarly, the admission of compressed air to the space between the two diaphragms 108 and 109 causes the diaphragms to bend oppositely. They are stopped by their engagement with their adjacent walls. The upward movement of diaphragm 108 does no useful work. The downward movement of the companion diaphragm 109 on the contrary acts upon the head of the valve stem to close the normally open valve. This cuts off the supply of steam as the like movement of valve 102 cuts off the supply of juice. When the air pressure is removed, the valve is restored to its normal position by spring pressure.

The pipe 110 is part of a well known construction for controlling the steam pressure. It is an air-operated steam pressure controller. It comprises a central dial instrument 111, an air pressure gauge 112 and a steam pressure gauge 113. In itself it forms no part of the present invention and so will not be further described. Compressed air is supplied through pipe 114 obtained from any suitable source. By the use of such a controller, the steam pressure is nicely regulated.

Valves like the diaphragm valves 102, 103, and the air-operated steam pressure controller, are put out by the Taylor Instrument Companies of Rochester, New York.

Now, when the canning machine is stopped for a sufficient interval, the juice continues to be supplied but is first throttled and held back at the juice tank N. Then it begins to accumulate in the separation chamber F until it reaches the short electrode 25. Then relay T is energized, followed by the energization of solenoid valve U. As a result of the operation of the latter, compressed air is supplied through pipe 101 to the valves 102 and 103 and they are operated to cut off the juice supplied through pipe A and the steam supplied through pipe C. It remains in this condition until relieved by the subsequent starting of the canning machine. As the canning proceeds, the juice is withdrawn from the tank N and as a result the throttle valve S is opened by the float 60. Then the juice in the separating tank F flows through pipes 20 to the centrifugal pump 40 and thence through pipe 41 into the tank N. It may be noted that the pump 40 being a centrifugal pump, may be operated continuously without pumping. This condition will occur when the float valve S is in throttling position. In consequence of the flowing of the juice from chamber F to tank N, the level of the liquid in the chamber F will gradually be lowered from its uppermost position in engagement with the short electrode 25 until it passes out of contact with the longer electrode 26. Thereupon, the relay T will be deenergized with the resultant restoration of the solenoid valve U to normal and the opening of the valves 102 and 103. The result will be the normal operation of the equipment. It will be noted that there is always some lag between the operation at the canner and the operation at the tank N and then at the chamber F.

In view of these various conditions in the operation of the equipment, it follows that in some instances, only the operations at the tank N will occur before the canning machine is started again. In other instances, the operations at the tank N will be followed by the operation at the chamber F, as before explained. Much depends upon the size of the valves, the piping and other features which will be recognized by those skilled in this art.

From what is said, it will be seen that the raw juice in passing through the equipment is prepared for canning by removing more or less of the oil. In other words, the raw juice is evaporated within a vacuumized chamber and thereby the greater portion of the juice suitable for canning is obtained. Then the remaining substance, comprising the oil and vapor constituents, is condensed, the non-condensibles being drawn off. Following this the heavier and lighter portions are separated, the heavier being put back into the stream of juice intended for canning, and the lighter portion containing the oil being separately barreled and kept out of the canning supply. Furthermore, when the juice flow is stopped for any reason, it backs up within the tank N or the separating chamber F, or both, and ultimately stops the supply.

In lieu of conveying all of the heavier substance taken out by the separator M and passed on through pipe 51 into the juice tank N, I may also provide a short length of pipe 115 connected to the pipe 51 and provide it with a valve 116. Upon opening this valve, a portion of the separated condensate may be drawn off into a pail or like receptacle 117 and used as desired. Thus, the concentration of the juice used for canning may be increased beyond that which would result from the direct flow into the tank N without withdrawing any. Thus, any desired grade of juice may be obtained, of course, within the limits of the available material, as will be obvious.

It will also be noted that in determining the temperature to which the juice may be heated will depend to a certain extent upon the amount of available water and its temperature. Thus, in the installation to which reference has been made, an installation in a Southern State, the temperature of the juice was taken as 130° F., as that would not damage the juice and would be economical in the use of water. If water at a lower temperature were available, such as we have in Northern States, then the temperature of the juice could be kept still lower without an excess of water. These are all matters capable of adjustment.

Again the juice supplied to the system at A may have a temperature, due to preheating, which is well nigh the evaporating temperature furnished by the heater and evaporator B. Then, obviouslly, the function of the heater and evaporator would be more evaporating than heating.

Besides the modifications suggested, it will be obvious that other alterations and modifications may be made in the apparatus disclosed without departing from the spirit and scope of the invention, which it is the purpose of the terms of the appended claims to cover.

I claim:

1. In an apparatus for continuously treating an aqueous liquid containing a volatile oil, the combination of a heater and means for continuously flowing fresh liquid therethrough, means for introducing a heating medium into said heater for heating the liquid during passage therethrough for vaporizing the greater portion of the oil and a relatively small portion of the water in said liquid, an expansion chamber connected with said heater for receiving and separating the heated liquid and said vapors, a condenser connected to and receiving the vapors from said chamber and having cooling means for condensing said vapor, an ejector connected with the vapor space in said condenser for withdrawing non-condensible gases and impressing a partial vacuum on the condenser, chamber and liquid in the heater, a separator connected with the condenser to receive the vapor condensate therefrom and adapted to separate the lighter oil vapor condensate from the heavier water vapor condensate, means continuously withdrawing the separated oil from the separator, means continuously withdrawing the unvaporized liquid from said chamber, and means continuously withdrawing the separated water vapor condensate from the separator and mixing it with said unvaporized liquid.

2. In an apparatus for continuously treating an aqueous liquid containing a volatile oil, the combination of a heater and means for continuously flowing fresh liquid therethrough, an expansion chamber connected with said heater for receiving heated liquid therefrom and separating therein oil and water vapors and non-condensible gases therefrom, a condenser connected for receiving all of the vapors and gases from said chamber and having cooling means for condensing said vapors, an ejector connected with the vapor space in said condenser for withdrawing non-condensible gases and maintaining a partial vacuum within said condenser, a separator connected with the condenser to receive all of the vapor condensate therefrom and adapted to separate the lighter oil condensate from the heavier water condensate by density differences, means continuously withdrawing the separated oil from the separator, means for continuously withdrawing unvaporized liquid from said chamber, and means for continuously withdrawing the separated water vapor condensate from the separator and mixing it with said unvaporized liquid.

3. In an apparatus for continuously treating citrus juice containing volatile oil, the combination of a heater and means for continuously flowing fresh citrus juice therethrough, an expansion chamber communicating with and for receiving said heated juice from said heater and separating therein oil and water vapors and non-condensible gases from the unvaporized portion of said juice, a condenser communicating with and for receiving all of the said vapors and gases from said chamber and having cooling means for condensing said vapors, an ejector communicating with and for withdrawing non-condensible gases from the vapor space in said condenser and maintaining a partial vacuum within said apparatus, a separator communicating with and receiving all of the vapor condensate from said condenser adapted to centrifugally separate the lighter oil condensate from the heavier water condensate, means for continuously withdrawing the separated oil from said separator, means for continuously withdrawing unvaporized juice from said chamber, and means for continuously withdrawing the separated water vapor condensate from the separator and mixing it with said unvaporized juice in a common receptacle.

4. In an apparatus for continuously treating an aqueous liquid containing volatile oils, the combination of a heater and means for continuously flowing fresh liquid therethrough, means for introducing a heating medium into said heater for heating the liquid during passage therethrough and vaporizing a greater portion of the oil and a relatively small portion of the water in said liquid, an expansion chamber connected with said heater for receiving and separating the heated liquid and said vapors, a connected condenser receiving the vapors from said chamber and having cooling means for condensing said vapors, an ejector connected with the vapor space in said condenser for withdrawing non-condensible gases and impressing a partial vacuum within the apparatus, a separator connected with the condenser to receive all of the vapor condensate therefrom and adapted to separate by density differences the lighter oil condensate from the heavier water condensate, means continuously withdrawing the separated oil from the separator, means for continuously withdrawing unvaporized liquid from said chamber, and means for continuously withdrawing the separated water vapor condensate from the separator and mixing it with said unvaporized liquid withdrawn from said chamber.

JOSEPH A. CROSS.

REFERENCES CITED

The following references are of record in the file of this patent:

UNITED STATES PATENTS

| Number | Name | Date |
|---|---|---|
| 496,488 | Ruud | May 2, 1893 |
| 515,889 | Todd | Mar. 6, 1894 |
| 1,719,431 | Kaiser et al. | July 2, 1929 |
| 1,851,266 | Todd | Mar. 29, 1932 |
| 1,943,106 | Burnham | Jan. 9, 1934 |
| 2,097,364 | Branson | Oct. 26, 1937 |
| 2,224,984 | Potts et al. | Dec. 17, 1940 |
| 2,240,952 | Hetzer | May 6, 1941 |
| 2,249,700 | Clayton | July 15, 1941 |
| 2,322,881 | Pollock | June 29, 1943 |
| 2,370,063 | Nutting et al. | Feb. 20, 1945 |
| 2,388,931 | Nelson | Nov. 13, 1945 |
| 2,419,528 | Biegel | Apr. 29, 1947 |
| 2,423,746 | Zahm | July 8, 1947 |
| 2,423,747 | Zahm | July 8, 1947 |
| 2,441,361 | Kirgan | May 11, 1948 |
| 2,457,315 | Milleville | Dec. 28, 1948 |

OTHER REFERENCES

Perry: "Chemical Engineer's Handbook," second edition, published 1941 by McGraw-Hill Book Co. Inc., New York, N. Y.

Badger and McCabe: "Elements of Chemical Engineering," second ed., published 1936 by McGraw-Hill Book Co., New York, N. Y.

Young: "Distillation Principles and Processes," published 1922 by Macmillan and Co., Ltd., St. Martin's Street, London, Eng.